United States Patent
Okada et al.

(10) Patent No.: US 7,260,605 B1
(45) Date of Patent: Aug. 21, 2007

(54) MESSAGE DISPLAY METHOD AND INFORMATION EXCHANGE SYSTEM AND STORAGE MEDIUM

(75) Inventors: Sumiyo Okada, Akashi (JP); Masahiko Murakami, Kobe (JP); Yasuhide Matsumoto, Akashi (JP); Hideto Kihara, Akashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/336,706

(22) Filed: Jun. 21, 1999

(30) Foreign Application Priority Data

Aug. 24, 1998 (JP) .................................. 10-237340

(51) Int. Cl.
*G06F 15/16* (2006.01)
*G06F 3/00* (2006.01)

(52) U.S. Cl. ....................................... 709/206; 715/758
(58) Field of Classification Search ................ 709/106, 709/204, 206; 345/752–759; 715/751–759
See application file for complete search history.

(56) References Cited

U.S. PATENT DOCUMENTS

| | | | | |
|---|---|---|---|---|
| 5,774,668 A | * | 6/1998 | Choquier et al. ........... | 709/223 |
| 5,793,365 A | * | 8/1998 | Tang et al. .................. | 345/329 |
| 5,828,839 A | * | 10/1998 | Moncreiff ................... | 709/204 |
| 5,894,305 A | * | 4/1999 | Needham .................... | 345/329 |
| 5,905,476 A | * | 5/1999 | McLaughlin et al. .......... | 345/1 |
| 5,990,887 A | * | 11/1999 | Redpath et al. ............. | 345/330 |
| 6,014,136 A | * | 1/2000 | Ogasawara et al. ......... | 345/331 |
| 6,081,830 A | * | 6/2000 | Schindler .................... | 709/204 |
| 6,212,548 B1 | * | 4/2001 | DeSimone et al. ......... | 709/204 |
| 6,336,133 B1 | * | 1/2002 | Morris et al. ............... | 709/204 |
| 6,397,250 B1 | * | 5/2002 | Clarke ........................ | 709/225 |

FOREIGN PATENT DOCUMENTS

| | | |
|---|---|---|
| JP | 4-242338 | 8/1992 |
| JP | 10154117 | 6/1998 |

OTHER PUBLICATIONS

W4: a World Wide Web browser with CSCW support, Grundy, J., Apperley, M., Computer-Human Interaction, pp. 334-335, Nov. 24-27, 1996.*

(Continued)

*Primary Examiner*—Beatriz Prieto
(74) *Attorney, Agent, or Firm*—Staas & Halsey LLP

(57) ABSTRACT

In an information exchange system in which a user terminal is connected to a network, the system is capable of transmitting and/or receiving messages via the network. A display area displaying messages transmitted and/or received can be increased with an increase in the number of networks connected, thereby causing the efficiency of processes due to reduction of the display area to deteriorate when such a display area is used simultaneously with other applications. The present invention reduces the display area by centralizing messages transmitted and/or received by each network, and displays these messages to an independent area on a time series basis. The system also enables transmission of messages to the network, to which the relevant message is transmitted, by identifying the message centralized for display. As a result, manipulation efficiency of the information exchange system is improved.

17 Claims, 9 Drawing Sheets

DIAGRAM ILLUSTRATING AN EXAMPLE OF IMAGE DISPLAYED ON THE DISPLAY APPARATUS

OTHER PUBLICATIONS

Social Activity indicators for groupware, Ackerman, M.s., Starr, B., Computer, pp. 37-42, Jun. 1996.*
TOURBUS: Internet Relay chat, Rankin, B. (Aug. 13, 1996).*
A Short IRC Primer, Pioch, N., Rasmussen, O., Hoyle, M.A., and Lo, J., Edition 1.2, Jan. 1997, pp. 1-35.*
eIRC 1.1.0, IRC client motif under Linux, Bono, E., 1998, pp. 1-2.*
LSE Research Online, Trading sexpics on IRC: embodiment and authenticity on the Internet, Slater, D., 1998.*
Electropolis: Communicatio and Communicty on Internet Relay Chat, Reid, E.M., 1991.*

* cited by examiner

FLOWCHART ILLUSTRATING CONTENT OF PROCESS
OF THE NOTIFIED MESSAGE RECEIVING MEANS

FLOWCHART ILLUSTRATING CONTENT OF PROCESS
OF DISPLAY PROCESSING MEANS

MESSAGE DISPLAY METHOD AND INFORMATION EXCHANGE SYSTEM AND STORAGE MEDIUM

BACKGROUND OF THE INVENTION

1. Technical Field of the Invention

The present invention relates to an information exchange system in which a plurality of users can transmit and/or receive messages via a network, and in particular, to an improvement of a message displaying method.

2. Related Art

In recent years, with the advancing technology in communication networks, information exchange systems, in which multiple users can transmit and receive messages with each other using the same network, is widely used. An example of an information exchange system is a chat system. In this example, multiple users have a common communication area (i.e., the same network) by utilizing an IRC (RFC 1459) protocol, etc. in order to transmit and receive messages among one another. Hence, users in the common communication field can observe the contents of messages originated by themselves, as well as the contents of messages transmitted by other users in the same communication field. That is, information exchange can occur while confirming messages transmitted from multiple users who are a part of the same communication field.

During information exchange in, for example, a chat system, a user who is participating in the communication does not always have to proffer his/her opinion. However, the user is only allowed to participate in messages transmitted from other users when actively a part of the common communication field. An application interface for a chat system is provided in, for example, (Japanese Published Unexamined Patent Application No. HEI 10-154117). A communication field in which users proffer therein opinions, and a communication field in which users only refer to messages of other users, can be displayed for identification. Messages in the "opinion" communication field can be transmitted and received while monitoring the contents of messages issued in the "refer" communication field.

The '117 reference discloses that the "opinion" field communication is defined as a main-channel, and the "refer" communication is defined as a sub-channel. Contents of the opinions issued on the main-channel and sub-channel can be identified through respective displays, on different display areas. An opinion area, transmitting messages to the main-channel, is displayed near the contents of the main-channel. Contents of messages issued in the channel designated by users, on the other hand, are displayed in the sub-channel. The channel designated here can be designated in a plurality of channels.

In the chat system described above, conversation from person to person is also possible. However, it is necessary to provide an individual common communication field (one common network) for each conversation partner. Additionally, a system may be provided wherein a user of a chat system has the ability to utilize various services that have been previously registered, thereby allowing various services to be used throughout the chat system. In order to transmit and receive requests and responses for these services, it is also necessary to participate in the common communication field.

Hence, the number of common communication fields (common networks or channels) increases per user, and the number of common fields designated for each reference will be increased depending on the number of conversations from person to person and the increase of services used throughout the common communication field. At present, the number tends to increase depending on the use of networks.

An increase in the number of common communication fields for reference purposes indicates that the amount of opinions displayed in the sub-channel area of the related art has also increased. Moreover, in the exemplified chat system, when different users are present on the main server, individual connections for each user are required. In this case, a plurality of windows for transmitting and receiving messages corresponding to the users are displayed, thereby narrowing the display area for manipulation of other applications.

SUMMARY OF THE INVENTION

It is therefore an object of the present invention to provide an interface which is flexible in use, and promotes efficiency at the time of transmitting a message to the common communication field in which users participate, and particularly, for the purpose of proffering opinions while minimizing the display area, even when users are participating in a plurality of common communication fields.

The present invention focuses on a common communication field in which users participate for the purpose of proffering opinions and referencing. That is, users are able to confirm the contents of opinions issued in a specific communication field. In this regard, the system aids users, when the contents of the opinions displayed have easily manipulated contents in the common communications field.

The present invention also enables the display area to be reduced, for example, in a chat system, by providing a message display concentrating and independently displaying the contents of messages transmitted and received in one or a plurality of common communication fields designated by a user. The present invention also enables issuance of opinions to the common communication field, to which such issuance of opinions is easily made, by instructing the opinion displayed on the message display.

The present invention provides an information exchange system in which a user terminal connected to a network can transmit and/or receive messages via the network. The system is characterized in that a user terminal can be connected to a plurality of networks, and has a message display area for displaying a message transmitted and/or received to/from each network. The system also acquires messages transmitted and/or received in a plurality of networks, and displays the acquired messages, on a time series basis, independent of the messages for each of the other plurality of networks.

DETAILED DESCRIPTION OF THE INVENTION

A preferred embodiment of the information exchange system to which the present invention is applied will now be explained below.

Figure 1:
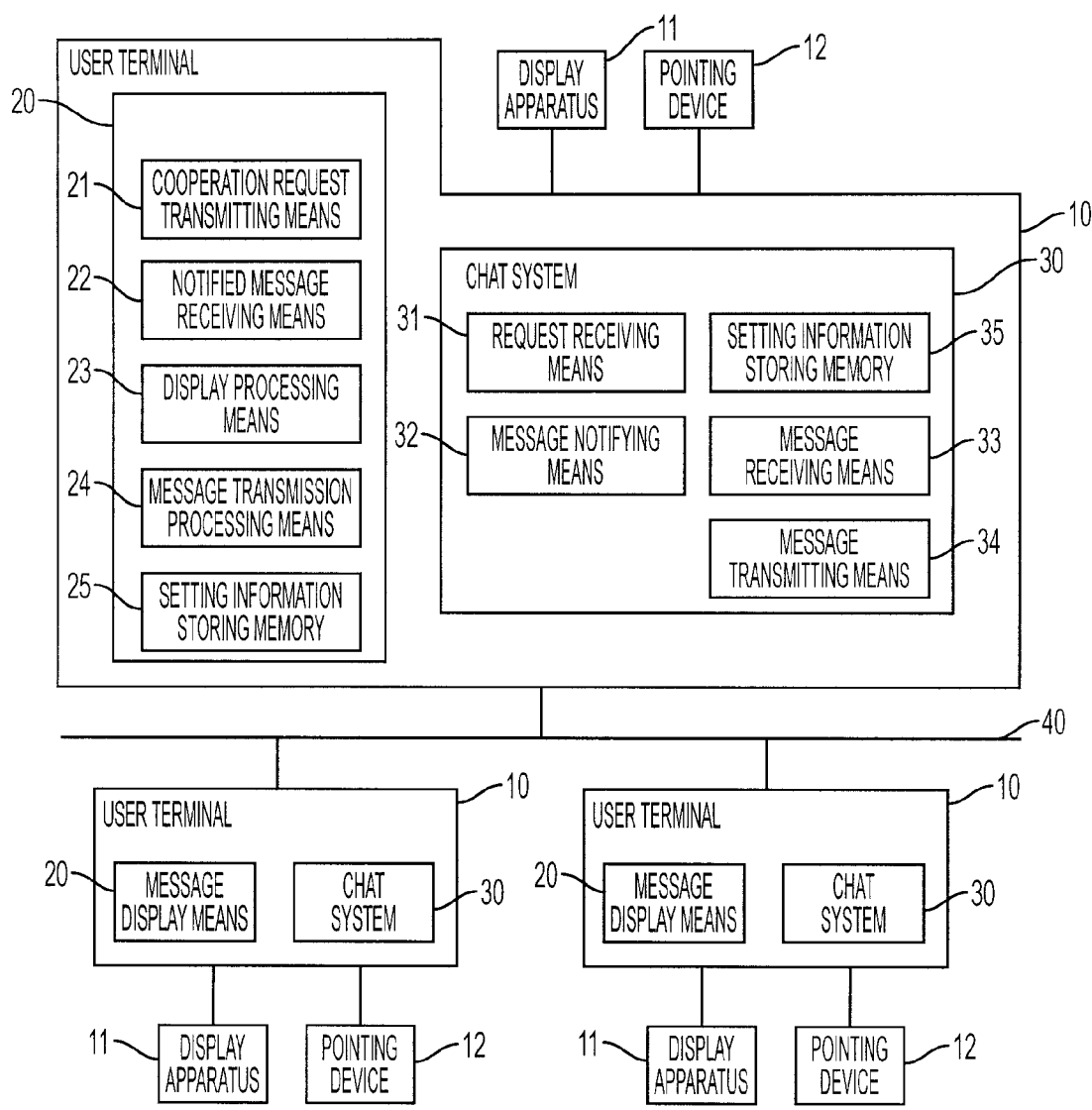
FIG. 1 illustrates the basic structure of the present invention.

FIG. 1 illustrates a basic structure of the present invention.

In this embodiment, a plurality of user terminals 10 are connected via a network 40, enabling mutual communication among them. A detailed structure is only illustrated for one of the user terminals. A minimum structure is illustrated for the other user terminals.

A user terminal 10 utilizes, for example, a chat system 30 to simultaneously transmit and/or receive messages to/from other user terminals 10 on a realtime basis. The chat system 30 includes, for example, a message receiving means 33 and a message transmitting means 34 for controlling message transmission and/or reception, respectively, as a basic function. The chat system 30 also includes a setting information storing memory 35, of which an operating condition is set, and a request receiving means 31 and a message notifying means 32 cooperatively functioning with the message display means 20. The request receiving means 31 executes processes based on requests transmitted from a cooperation request transmitting means 21 and a message transmission processing means 24 of the message display means 20. The message notifying means 32 transfers the message received by the message receiving means 33 to the message display means 30.

The message display means 20 includes, for example, the cooperation request transmitting means 21, a notified message receiving means 22, a display processing means 23, a message transmission processing means 24 and the setting information storing memory 25.

The cooperation request transmitting means 21 transmits and/or receives the setting information required for operating the chat system 30 and message display means 20 at the same time. The notified message receiving means 22 receives a message transmitted from the message notifying means 32, of the chat system 30, and displays the message on the display apparatus 11 using the display processing means 23. The message transmission processing means 24 operates together with the chat system 30, when a user responds to a message including the contents of the message displayed by the message display means 20, or displays the interface to send the message directly.

Figure 2:
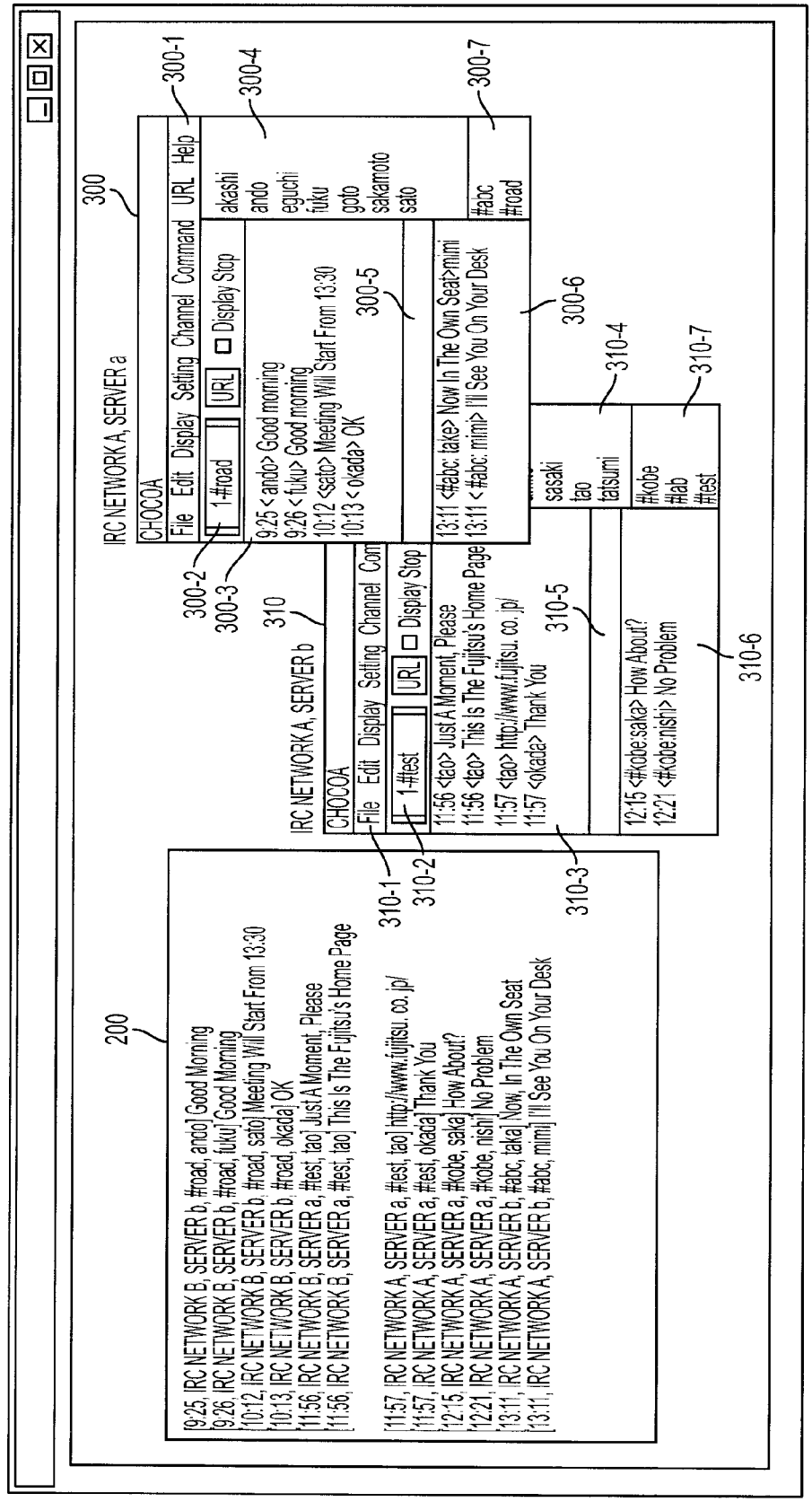
FIG. 2 illustrates an example of an image displayed on the display.

FIG. 2 illustrates an example of a display image displayed on the display apparatus 11. The display areas 300 and 310 are examples of the image displayed by the chat system 30. Since display areas 300 and 310 are connected to the service offering users of the two chat systems, two windows on the display area 300 are displayed by the chat system 30. The chat system 30 is connected to the IRC network A, and the display area 310, also displayed by the chat system 30, is similarly connected to the IRC network B and displayed on the display apparatus 11. In this example, the IRC network is defined as a logical network formed in units of services offered to users of the chat system 30, and is different from a physical network.

Additionally, a plurality of channels exist as the common communication fields within each IRC network. The common communication field is hereinafter referenced to as a "channel".

The display areas 300 and 310 of the chat system 30 include tool bar display areas 300-1 and 310-1, respectively, for instructing, for example, various manipulations of the displayed data with a pointing device 12, channel switching instructing areas 300-2 and 310-2 for switching the channel for sending a message, main-channel display areas 300-3 and 310-3 for displaying a message transmitted and/or received by the channel (hereinafter referred to as a main-channel) for sending a message, message input areas 300-5 and 310-5 for transmitting a message to the main channel, user list display areas 3004 and 3104 for displaying a list of users connected to the main-channel, sub-channel display areas 300-6 and 310-6 for displaying the contents of a message transmitted and/or received by other channels (hereinafter referred to as a sub-channel) designated by a user and channel list display areas 300-7 and 310-7 for displaying a list of the main-channel and sub-channel designated by the user.

The display area 200 is an example of an image displayed by the message display means 20. In this case, the messages transmitted and/or received in the channel #abc and #road of the IRC network A and #kobe, #1*ab* and #test of the IRC network B, connected in the chat system 30 by users, are displayed on a time series basis.

Below is a description of the process for displaying the transmission and receipt of messages by a plurality of channels using the chat system 30, by the message display means 20.

Figure 3:
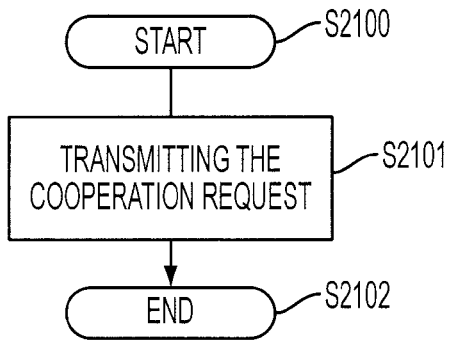
FIG. 3 is an exemplary flowchart illustrating the contents of the process of the cooperation request transmitting means.
Figure 4:
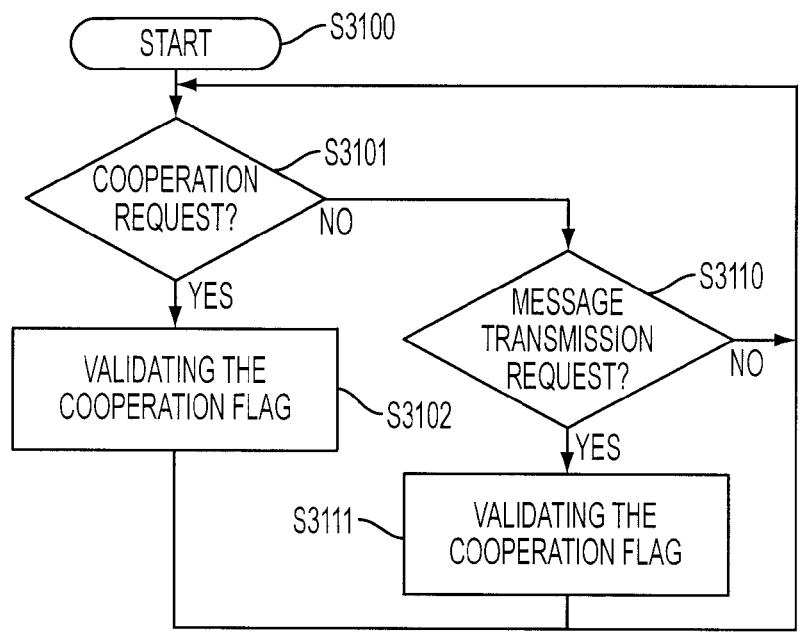
FIG. 4 is an exemplary flowchart illustrating the contents of the process of the request receiving means.

First, the setting process for operating the message display means 20 and chat system 30 concurrently will be explained. When the message display means 20 is started, the cooperation request transmitting means 21 is driven (step S2100 of FIG. 3) to send (step S2101 of FIG. 3) a cooperation request (for example, a command called REPORT-MESSAGE) to the chat system 30. The request receiving means 31, of the chat system 30, determines whether it is the cooperation request from the message display means 20. When the request receiving means 31 determines that it is the cooperation request (for example, a command called REPORT-MESSAGE)(YES in the step S3101 in FIG. 4), the cooperation flag of the setting information storing memory 35 is validated (step S3102 of FIG. 4). Hence, a path for automatically transmitting the contents of the message transmitted and/or received by the chat system 30 is extended between the chat system 30 and message display means 20. Thereafter, the message received by the message receiving means 33, of the chat system 30, and the message transmitted by the message transmitting means 34 are also notified to the message display means 20 via the message notifying means 32.

In this example, a message is transmitted from a user terminal 10 in the chat system 30. The contents of the message transmitted are sent to the network together with the IRC network name, the channel name and the name of the message transmitting user transmitted by the relevant user for addressing users who are participating in the same channel. This system is, however, only an exemplary embodiment of the chat system 30.

Upon reception of a message, the message receiving means 33 displays the contents of the message to the main-channel display area 300-2 or the sub-channel display area 300-6, and notifies the message display means 20 via the message notifying means 32, that the message has been received.

Figure 5:
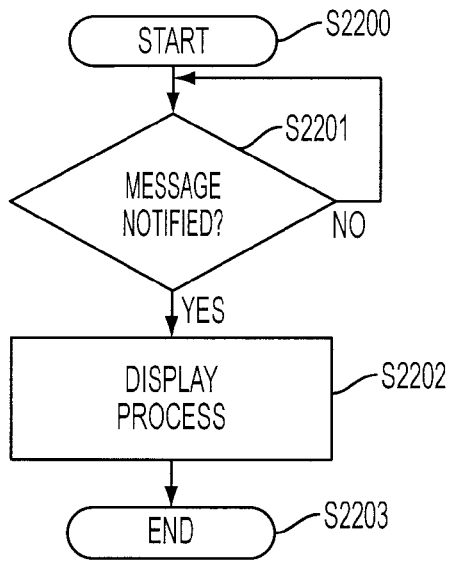
FIG. 5 is an exemplary flowchart illustrating the contents of the process of the notified message receiving means.

The notified message receiving means 22, of the message display means 20, monitors whether a message is notified from the chat system 30 (step S2201 of FIG. 5). When notification of the message is confirmed (YES in the step S2201 of FIG. 5), the message is displayed via the display processing means 23 (step S2203 of FIG. 5).

Figure 6:
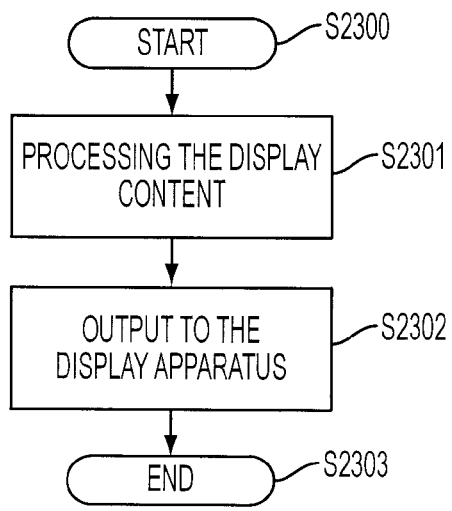
FIG. 6 is an exemplary flowchart illustrating the contents of the process of the display processing means.

The display processing means 23 processes the message received, via the notified message receiving means 22, in a format desired by the user (step S2301 of FIG. 6). The message is then output to the display apparatus 11. Several methods may be used to process the message, as described below.

In a first method, the received message is composed of the IRC network name, the channel name, the user name (or nickname), the message issuing time and the message content. Only the user name and the message contents, among the factors explained above, are displayed by selecting the display items. Therefore, the width of the display area 200 can be reduced, resulting in the reduction of the total display area of the display apparatus 11. When the chat system 30 and other applications are used simultaneously, the display area, by operation of the other applications, can be enlarged, simplifying the operation of other applications.

In yet another method, messages are conditionally displayed from other messages. Conditionally displayed is defined as visually displaying the message meeting the condition from the messages being displayed on a time series basis. For example, if a font is changed in a message such that it is different from the font in other messages, a message is displayed by flickering or inversely displaying the message.

A keyword may be included in the message and set as a word item. For example, the IRC network name, the channel name, the user name (nickname), a desired character string designated by the user and a message issuing time. In this regard, a user can register the keyword included in the message such that it is displayed separately from the other messages. The message is also registered to the setting information storing memory 25 of the message display means 20. When the main-message is notified from the chat system 30, it is determined whether the keyword registered in the setting information storing memory 25 is included in the message. When the keyword is included in the message, the message is edited based on the designated display method, and is displayed on the display apparatus 11.

It is also possible to display the last 10 lines, or within a particular time period, to distinguish from the other messages.

Hence, a user can designate which message should be displayed on the display area 200 for easy access.

In still another method messages to be displayed can be freely selected.

Selection of messages may, for example, be conducted on the basis of a keyword included in the message. For example, the IRC network name, the channel name, the user name (nickname) and a desired character string designated by a user may be listed as the keyword. A user is recommended to register the keyword in the message as a display object, prior to setting information storing memory 25 of the message display means 20. When the message is received from the chat system 30, a user is able to check whether the keyword registered to the setting information storing memory 25 is included in the message. When the keyword is included in the message, a user can edit the message and display it on the display apparatus 11. Since the message contents of all channels connected by a user are notified from the chat system 30, and then displayed at a specified time, the amount of messages notified increases proportionally to the number of channels connected. Through the selective display of messages, only the messages with which a user is interested are displayed, reducing congestion on the display area 200.

The setting information in the setting information storing memory 25 validates a cooperation flag in the chat system 30, when the cooperation request is transmitted from the message display means 20. The setting information transmits the contents of the setting information storing memory 25, registered in the chat system 30, to the message display means 20. Hence, the received information is stored in the setting information storing memory 25 in the message displaying means 20. Otherwise, the setting means is provided in the message display means 20 in order to designate the processing method at the time of displaying the message, independent of the chat system 30.

Accordingly, when a user is utilizing the chat system 30 by extending the connections to a plurality of channels, messages of all channels connected may be displayed on a time series basis, on the same display area.

The procedures for sending the message to a channel to which the message is transmitted, by utilizing the contents of the message displayed in the same display area, will now be explained.

First, a method for switching the main channel of the display area 300 of chat system 30 to the channel of the message, and then transmitting the message from the message input area 300-5, by instructing the message content displayed on the display area 200, will be explained as an example.

Figure 7:
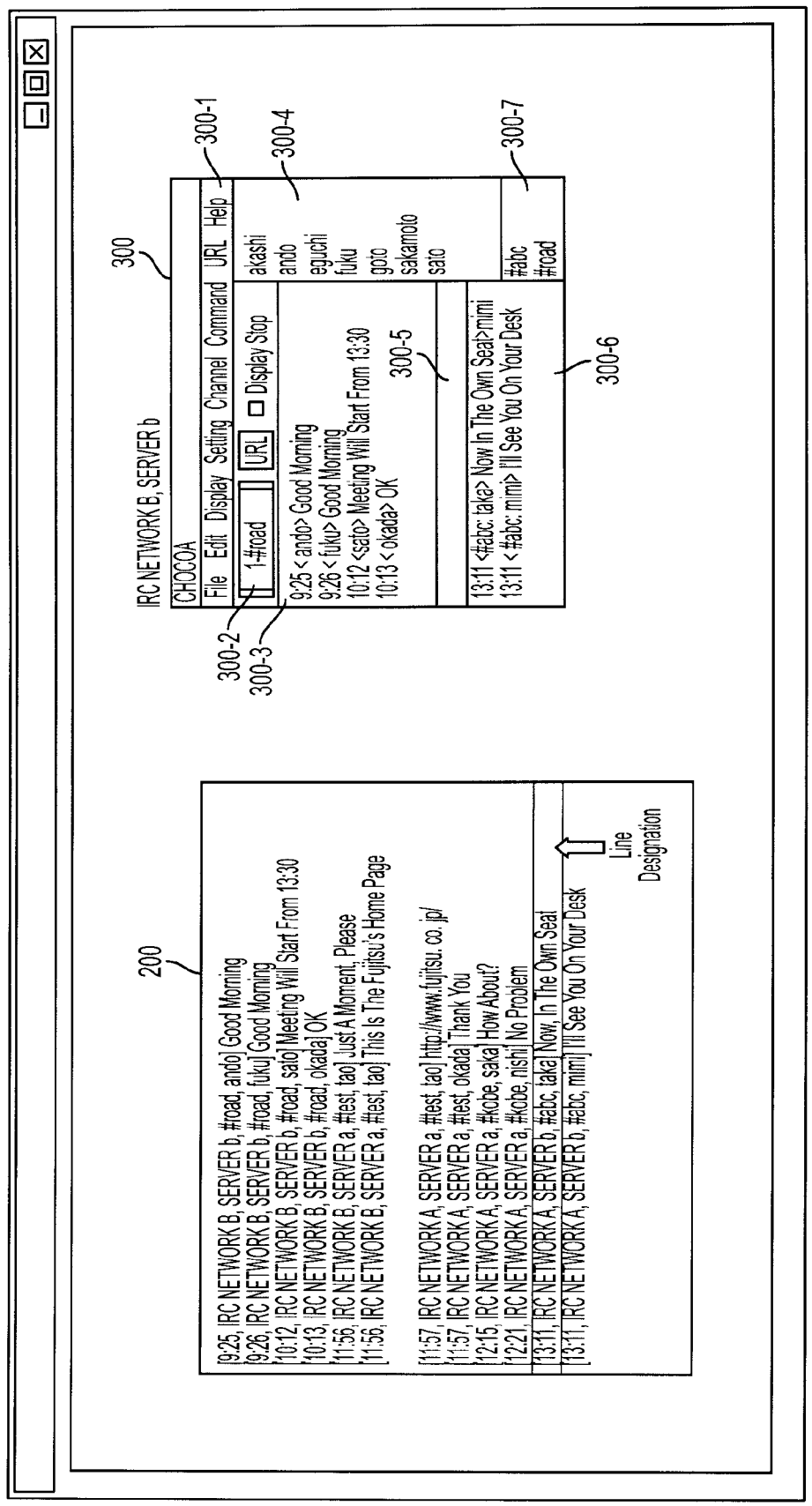
FIG. 7 is an exemplary diagram (No. 1) illustrating a display image in the first embodiment for instructing a message transmission.

In this example, it is assumed that the image in FIG. 7 is displayed on the display apparatus 11 of a particular user terminal 10, from the message display means 20 and chat system 30. The user is connected to the channels #test and #kobe of the IRC network A, and the channels #road and #abc of the IRC network B. The contents of the messages of these channels are displayed on a time series basis in the display area 200. In the display area 300, only the operation image of the chat system 30, connected to the IRC network B, is actively displayed. In the time series basis, the channel #road is designated as the main-channel. The display image of the chat system 30, connected to the IRC network A, is activated for display by receiving an instruction from the user or another application.

In this example, it is also assumed that the user is interested in the message displayed in the second lowest line among the messages displayed in the display area 200, and that he/she is trying to transmit a message using a specified channel.

Figure 9:
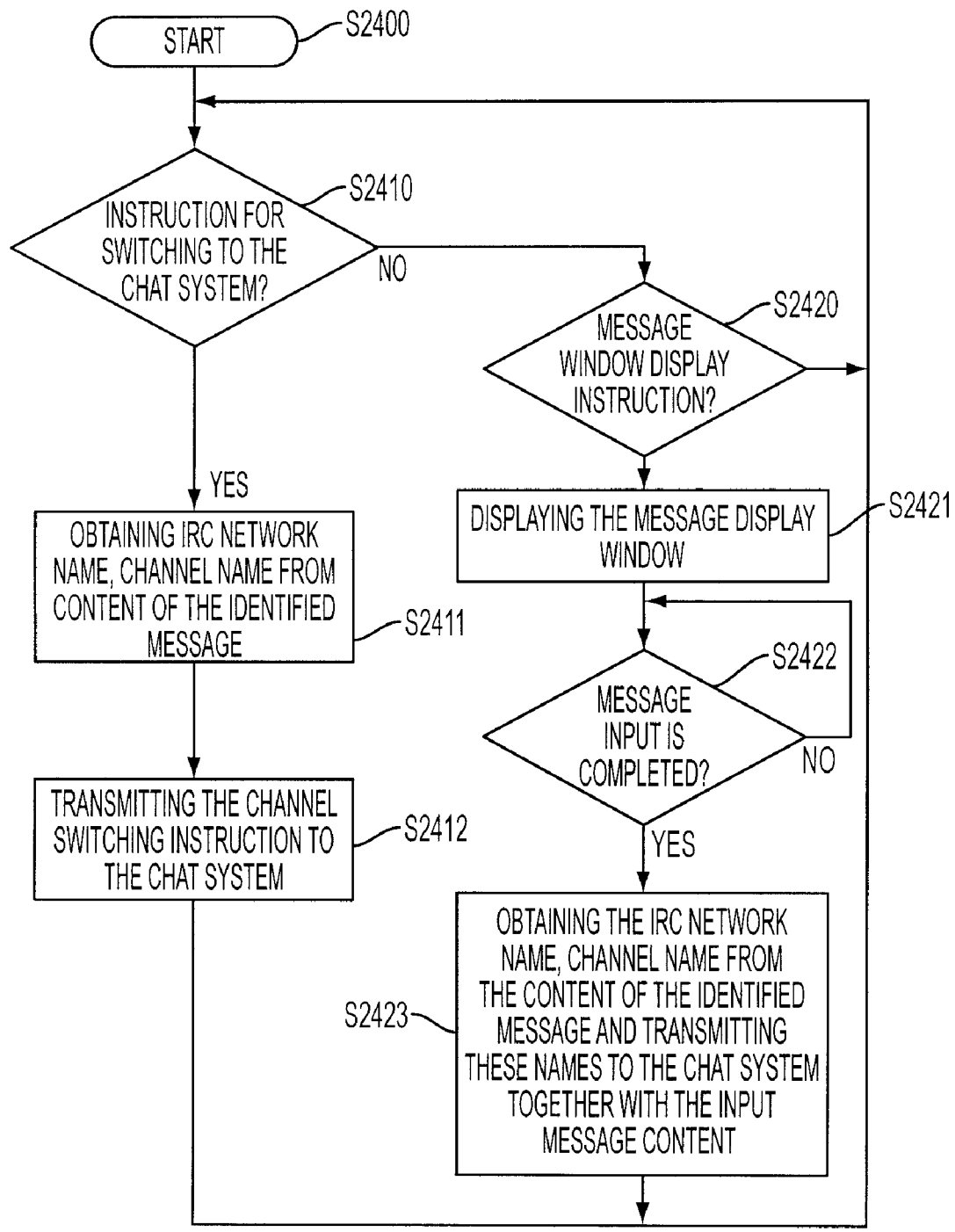
FIG. 9 is an exemplary flowchart illustrating the contents of the process of the message transmission processing means.

The user identifies the message of the display area 200 using, for example, a pointing device, and performs, for example, a double-click on the mouse (a double-click on the mouse is only an example, a key operation is also possible). Upon detection of a double-click as the switching instruction to the chat system 30 (YES in the step S2410 in FIG. 9), the message transmission processing means 24 analyzes the contents of the identified message to obtain (step S2411 of FIG. 9) the IRC network name (IRC network B) and channel name (#abc). Using the IRC network name and channel name obtained, the message transmission processing means 24 generates the main-channel switching instruction (for example, a join command), and transmits this instruction to the chat system 30 (step S2412 of FIG. 9). The chat system 30 switches, upon reception of the main-channel switching instruction transmitted from the message display means 20, the main-channel of the chat system 30 connected to the IRC network (IRC network B) and transmits the switching instruction to the channel (#abc) together with the switching instruction.

Figure 8:
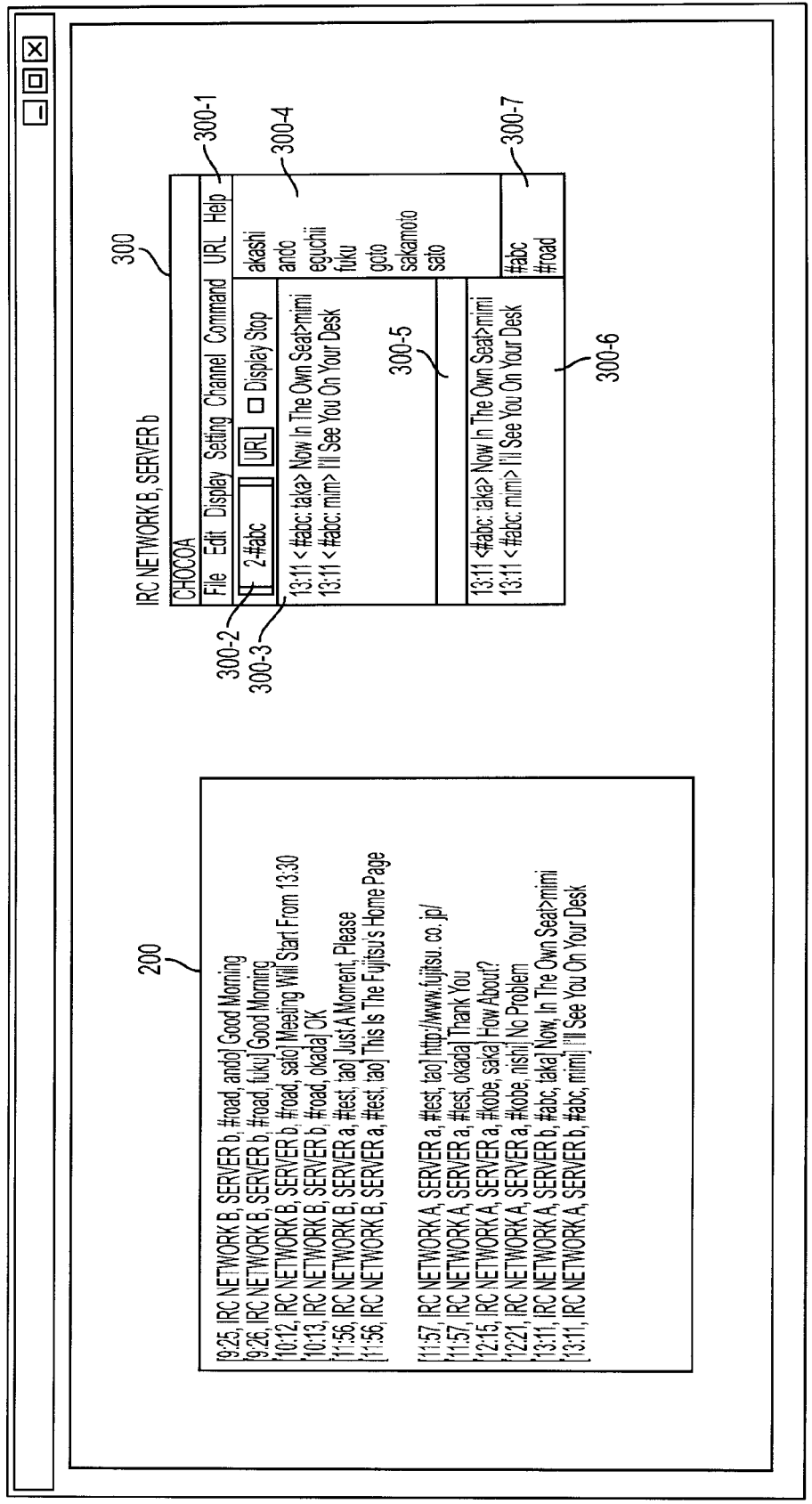
FIG. 8 is an exemplary diagram (No. 2) illustrating a display image in a first embodiment for instructing a message transmission.

FIG. 8 illustrates a condition after switching has occurred. The channel name (#abc) transmitted is set to the channel switch instructing area 300-2, and the contents of main-channel display area 300-3 are also switched to the display of the message contents in the channel (#abc). The contents of channel (#road), which is displayed on the main-channel display means in FIG. 7, is then displayed on sub-channel display area 300-6. In this case, when the display areas 300 and 310 of the chat system 30, to which the relevant IRC network is connected, are not activated, the display area is activated.

The display image of the chat system 30 (which is ready for transmitting a message to the channel), in which the message is issued, is automatically displayed by instructing the message displayed on the message display means 20. Accordingly, a user can immediately transmit a message to the relevant channel.

Another method for transmitting a message directly to the display area 200 will now be explained.

Figure 10:
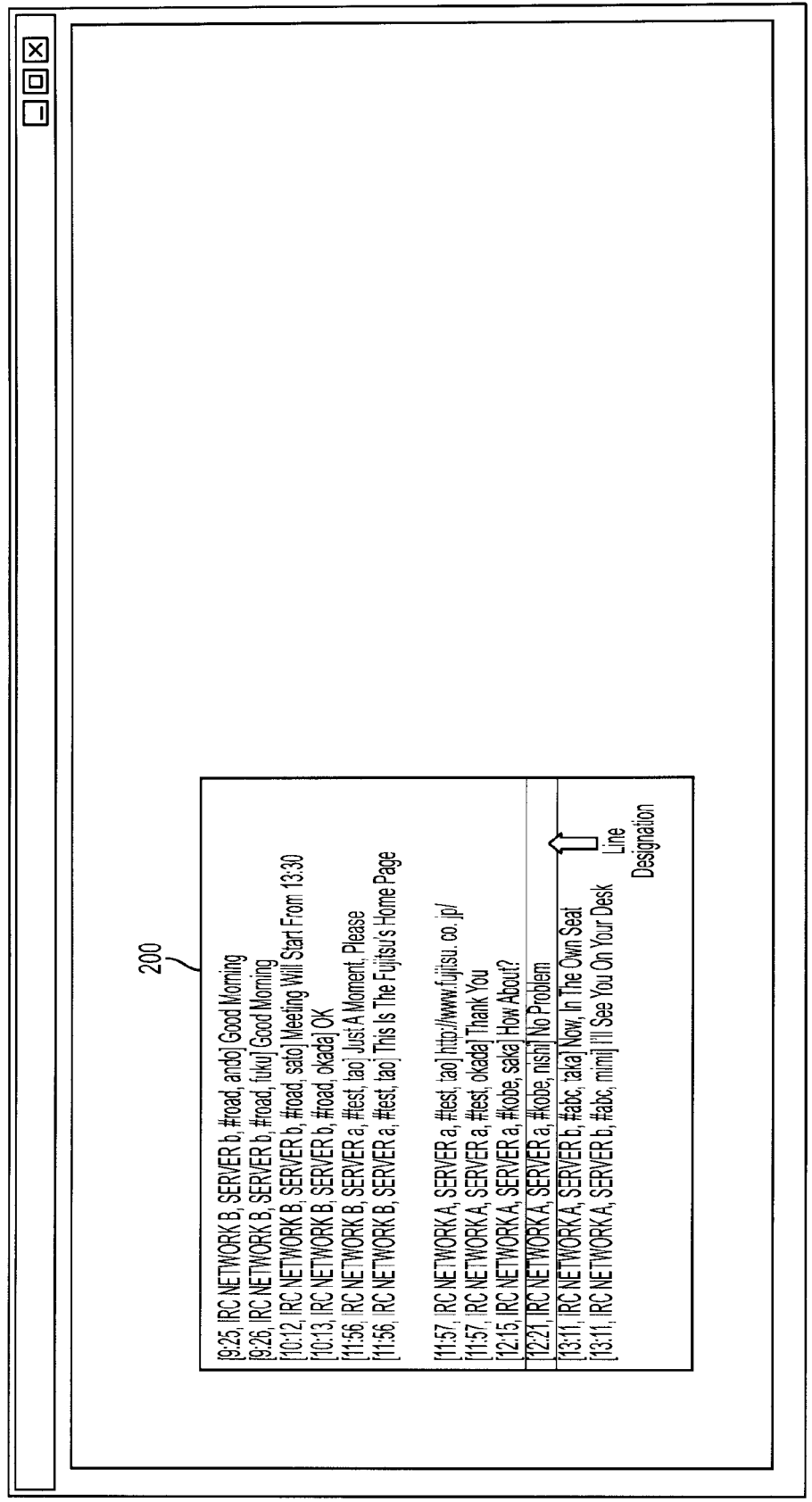
FIG. 10 is an exemplary diagram (No. 1) illustrating a display image in the second embodiment for instructing a message transmission.

FIG. 10 illustrates an example when the display area of the chat system 30 is not activated, and the display area 200 of the message display means 20 is activated.

In this example, it is assumed that a message is transmitted directly from the message display area 200 to the channel in which the message is displayed at the second lowest line.

Figure 11:
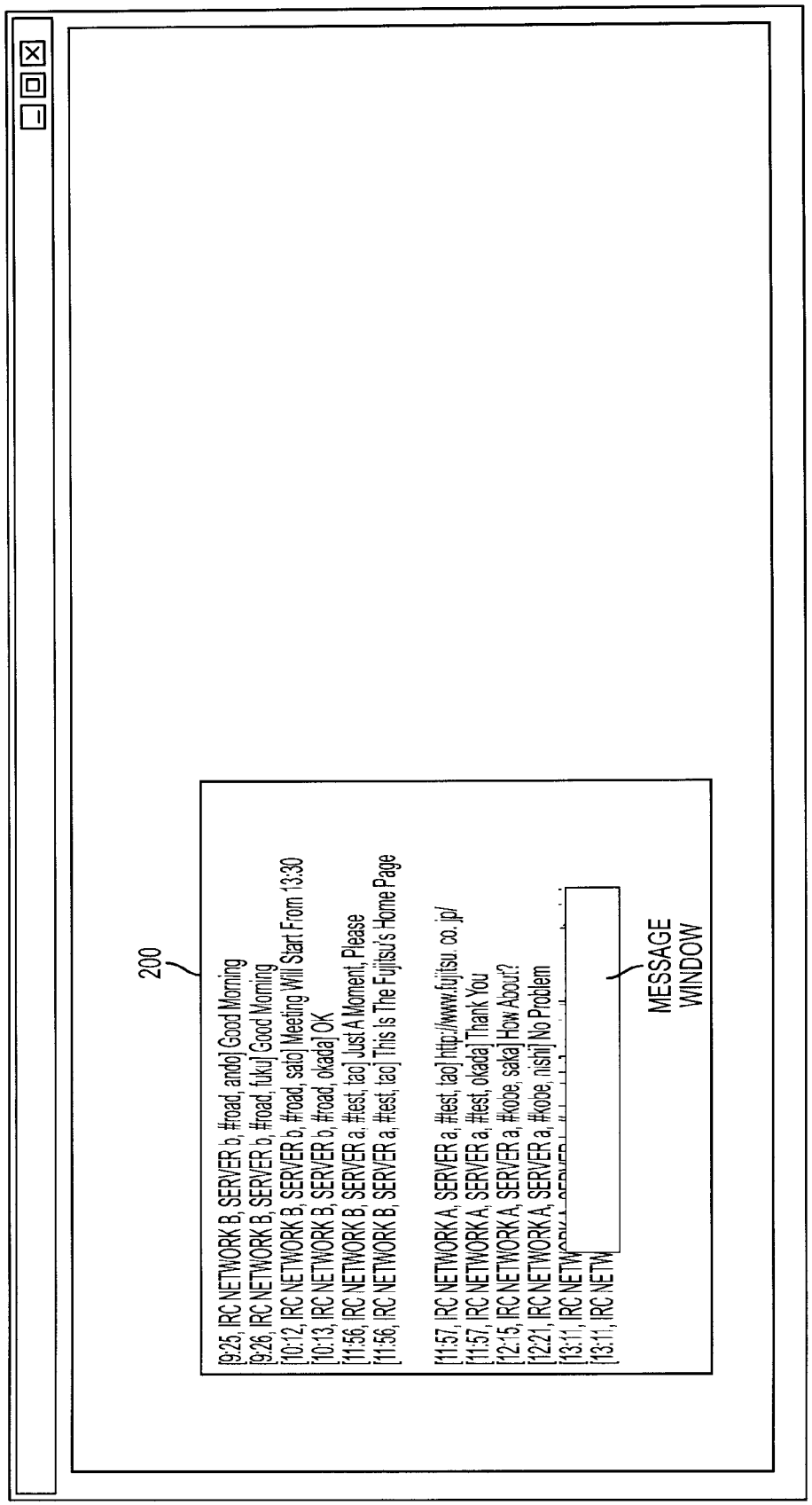
FIG. 11 is an exemplary diagram (No. 2) illustrating a display image in the second embodiment for instructing a message transmission.

A user can identify the message of the display area 200 with, for example, a pointing device, and simultaneously depress, for example, a control key on a keyboard and a click of the right button of a mouse (the key operation is also an example, and depression of another key is also possible). Upon detection that the control key and click of the right button of the mouse has occurred simultaneously (as the instruction for switching the display of message window) (YES in the step S2420 of FIG. 9), the message transmission processing means 24 displays (step S2421 of FIG. 9) the message window 210 (FIG. 11) to the display area 200. The user then inputs the contents of the message to be transmitted to the message window 210 being displayed. When input of the contents of the message is completed (YES in the step S2422 of FIG. 9), the user obtains the IRC network name (IRC network B) and the channel name (#abc) by analyzing the message instructed and generates a message transmitting instruction (for example, a privmsg command) from the user name (nickname, and inputs the message contents and transmits instruction to the chat system 30.

Upon receipt of the message transmitting instruction from the message display means 20, the chat system 30 sends the message contents to the channel of the IRC network.

Hence, it is possible to send a direct message to the channel where the message exists, by instructing a message displayed by the message display means 20.

In another embodiment, it is a precondition that all messages transmitted and/or received by the chat system 30 are notified to the message display means 20, while still being able to identify the cooperated IRC network and channel. In this case, the cooperation request transmitting means 30 displays an image urging users to designate the cooperated IRC network name and the channel name. The cooperation request transmitting means 21 then notifies the chat system 30, and the channel name designated by user, of the IRC network name. The request receiving means 31, of the chat system 30, registers the notified IRC network name and the channel name to the setting information storing memory 35. Thereafter, the message receiving means 33, or message notifying means 32, judges when the message is received, the IRC network and channel to which the message is transmitted and notifies the message to the message display means 20 via the message notifying means 32 for those considered as the cooperation object. Thereby, selection of messages can be conducted using the IRC network name and the channel name as the keyword.

It is also assumed in this embodiment that a processing method is set in the message display means 20 at the time of displaying a message. However, it is also possible that this function is given such that the message display means 20 can receive a message when it is processed by the chat system 30 to a predetermined display mode, and then displayed directly to the display area 200 of the message display means 20.

According to the information exchange system of the present invention, in which users can transmit and/or receive messages via a plurality of networks, even when the number of networks connected by users increases, contents of messages can be consolidated to the same area to minimize the area to display the messages in the information exchange system, thereby allowing users to perform a plurality of operations effectively while exchanging information with other users through the user terminals by expanding the operation area of other applications on the display apparatus.

Moreover, since it is now possible to transmit a message directly to the network where the message exists by instructing the messages centralized for display, a user is not required to intentionally switch the processed images of the message display means and a basic function of the information exchange system and manipulation efficiency at the time of sending the message is therefore improved.

In this disclosure, there is shown and described only the preferred embodiment of the invention, but, as aforementioned, it is to be understood that the invention is capable of use in various other combinations and environments and is capable of changes or modifications within the scope of the invention concept as expressed herein.

What is claimed is:

1. A method of displaying messages with a chat client in an information exchange system for transmitting and receiving the messages, the chat client transmitting and receiving the messages to and/or from at least two independent chat networks that each have one or more chat servers that provide independent chat communication service to chat clients, where the chat client is in chat communication with the two chat networks concurrently over a period of time, the method comprising:

designating, with the client, at least one of the two chat networks as an active chat network for receiving messages transmitted by the client;

requesting and obtaining cooperation from the two chat networks for display of messages of the two chat networks, a chat network having one or more chat channels, upon cooperation being obtained, a chat channel which the chat client connected on a chat network cooperates with chat channels that the chat client connected on another chat network;

obtaining, with the client, the messages, at least some of which are transmitted to or received from a first of the at least two chat networks, and at least some of which are transmitted to or received from a second of the at least two chat networks; and displaying, with the client, the obtained messages in a first discrete display area independent of a message display area of each of the plurality of chat networks.

2. A method according to claim 1, wherein the displaying comprises displaying messages of both chat networks in the discrete display area independent of another display area for displaying messages of only one of the chat networks.

3. A method according to claim 1, wherein the discrete display area is separate from another display area that is dedicated to the active chat network.

4. A method according to claim 1, wherein each independent chat network comprises its own set of chat channels separate from the other chat network, where a channel in the first chat network and a different channel in the second chat network are allowed to each have a same identifier for users to select such channels but where such different channels do not share messages.

5. A method according to claim 1, wherein chat messages are not exchanged between the two chat networks.

6. A method according to claim 1, wherein the chat networks are different logical chat networks and where a message received by the client is identified according to the network from which it was received.

7. A method according to claim 1, wherein the discrete display area is a window of the chat client.

8. A volatile or non-volatile computer-readable storage storing information to allow a computer to perform the method of claim 1.

9. An information exchange system in which user terminals are configured for connection to a plurality of chat networks to transmit and receive messages through the plurality of chat networks, the user terminals having a message display area displaying messages transmitted and received to/from each of the plurality of chat networks, comprising:

designation means designating at least one chat network of the plurality of chat networks as an active chat network for receiving messages transmitted by a user terminal;

message acquiring means of the user terminal for acquiring messages transmitted and received to/from each of the plurality of chat networks requested by cooperation request transmitting means, a chat network having one or more chat channels, upon cooperation being requested, a chat channel which a user connected on a chat network cooperates with chat channels that the user connected on another chat network; and message displaying means of the user terminal for displaying, the acquired messages in a discrete display area independent of a message display area of each of the plurality of chat networks.

10. An information exchange system according to claim 9, further comprising message transmission cooperating means of the client for transmitting one of the messages, when the message displayed by said message displaying means is identified for message transmission, to one of the chat networks in the plurality of chat networks to which said identified message is transmitted.

11. A method of displaying messages with a chat client in an information exchange system for transmitting and receiving the messages, the chat client transmitting and receiving the messages to and/or from at least two independent chat networks that provide independent chat communication service to chat clients, where the chat client is in chat communication with the two chat networks concurrently over a period of time, the method comprising:

requesting and obtaining cooperation from the two chat networks for display of messages of the two chat networks, a chat network having one or more chat channels, upon cooperation being obtained, a chat channel which the chat client connected on a chat network cooperates with chat channels that the chat client connected on another chat network;

obtaining, with the client, the messages, at least some of which are transmitted to or received from a first of the at least two chat networks, and at least some of which are transmitted to or received from a second of the at least two chat networks; and displaying, with the client, the obtained messages in a first discrete display area.

12. A method according to claim 11, wherein the first discrete display area comprises a window of the chat client.

13. A method according to claim 11, wherein messages to or from the two chat networks and displayed in the discrete display area are interspersedly transmitted and received by the chat client over the period of time.

14. A method according to claim 11, wherein one of the chat networks is designated as a current destination for messages to be transmitted by the client when a user selects a corresponding message displayed in the discrete display area.

15. A volatile or non-volatile computer-readable storage storing information to allow a computer to perform the method according to claim 11.

16. A method of displaying messages with a chat client in an information exchange system, the chat client transmitting and receiving the messages to and/or from at least two independent chat networks that provide independent chat communication service to chat clients, where the chat client is in chat communication with the two chat networks concurrently over a period of time, the method comprising:

requesting and obtaining cooperation from the two chat networks for display of messages of the two chat networks to automatically extend a path for the messages, a chat network having one or more chat channels, upon cooperation being obtained, a chat channel which the chat client connected on a chat network cooperates with chat channels that the chat client connected on another chat network;

obtaining, with the client, the messages of the two chat networks; and displaying, with the client, the obtained messages in a first discrete display area using the extended path.

17. A method of displaying messages with a chat client in an information exchange system for transmitting and receiving the messages, the messages transmitted and received on a plurality of chat networks each chat network having a plurality of chat channels, the method comprising:

choosing from among the plurality of chat networks at least one chat network as an active chat network for receiving messages transmitted by the client from a plurality of chat networks, the chosen network cooperating with at least another chat network; and displaying messages transmitted to or received from the cooperating chat networks in a first discrete display area.

* * * * *